Sept. 3, 1935.                H. A. WHEELER                2,013,121
                       AUTOMATIC AMPLIFICATION CONTROL
                  Original Filed April 6, 1932    3 Sheets-Sheet 1
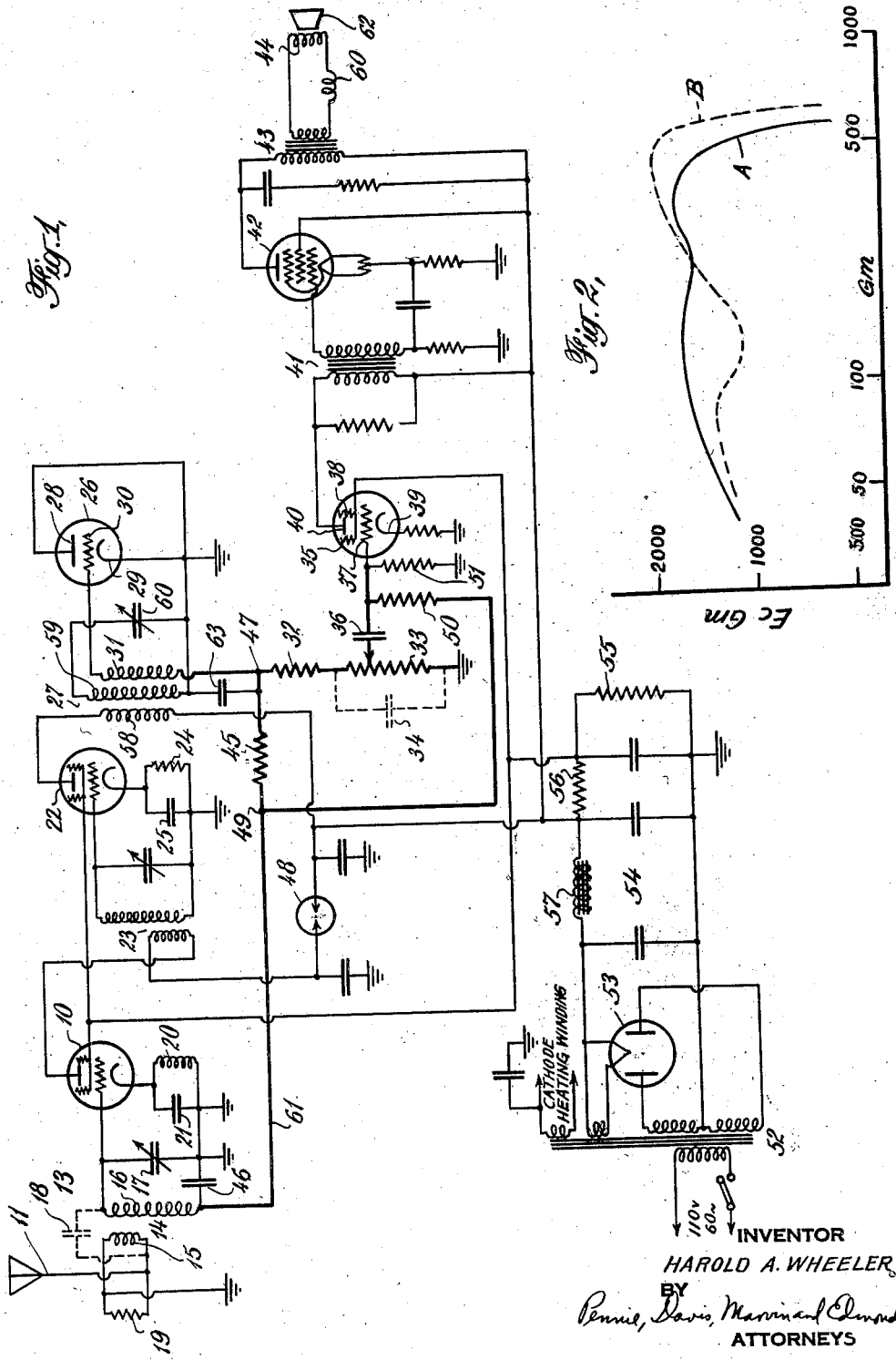
INVENTOR
HAROLD A. WHEELER
BY
Pennie, Davis, Marvin and Edmonds
ATTORNEYS

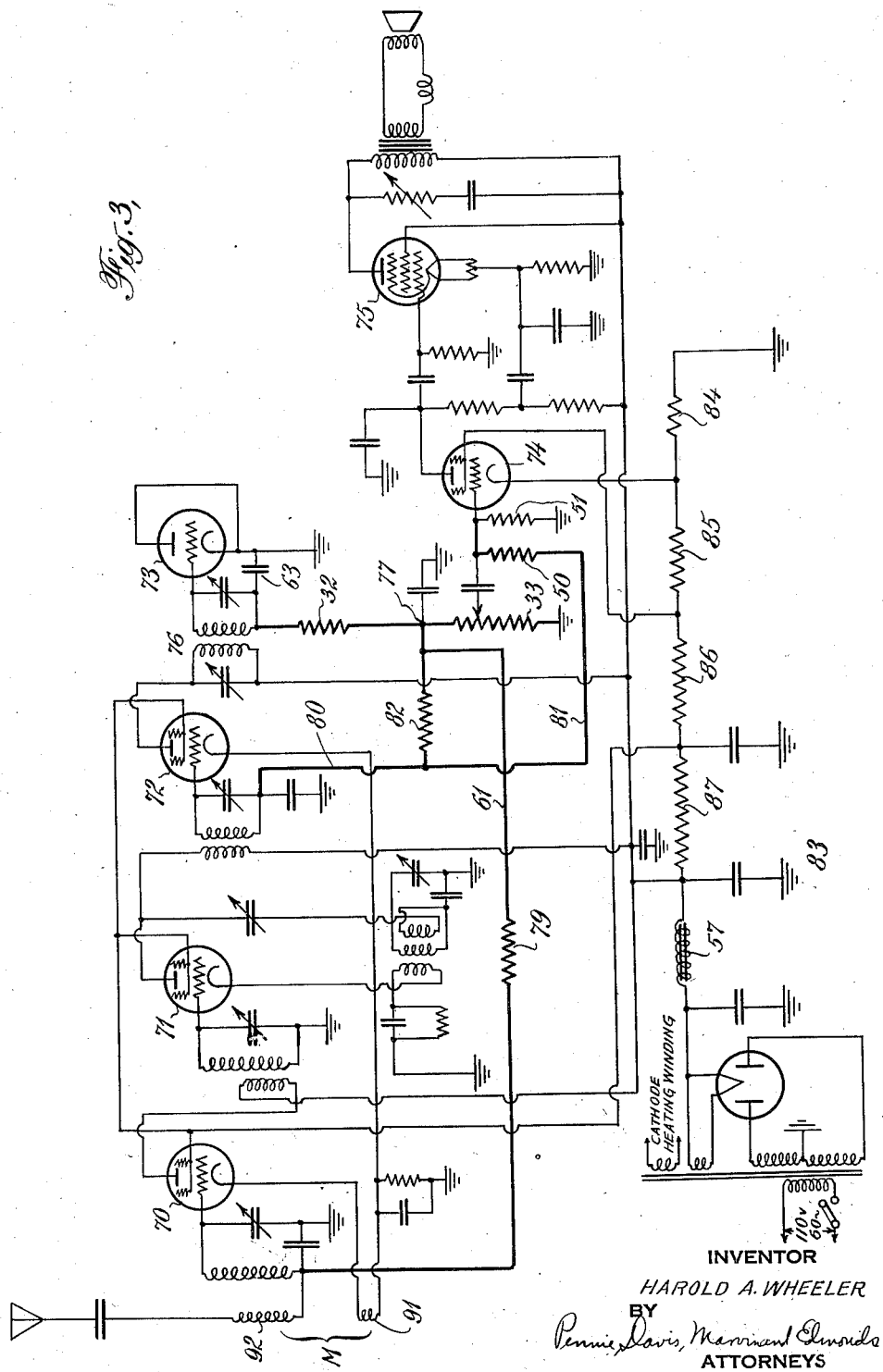

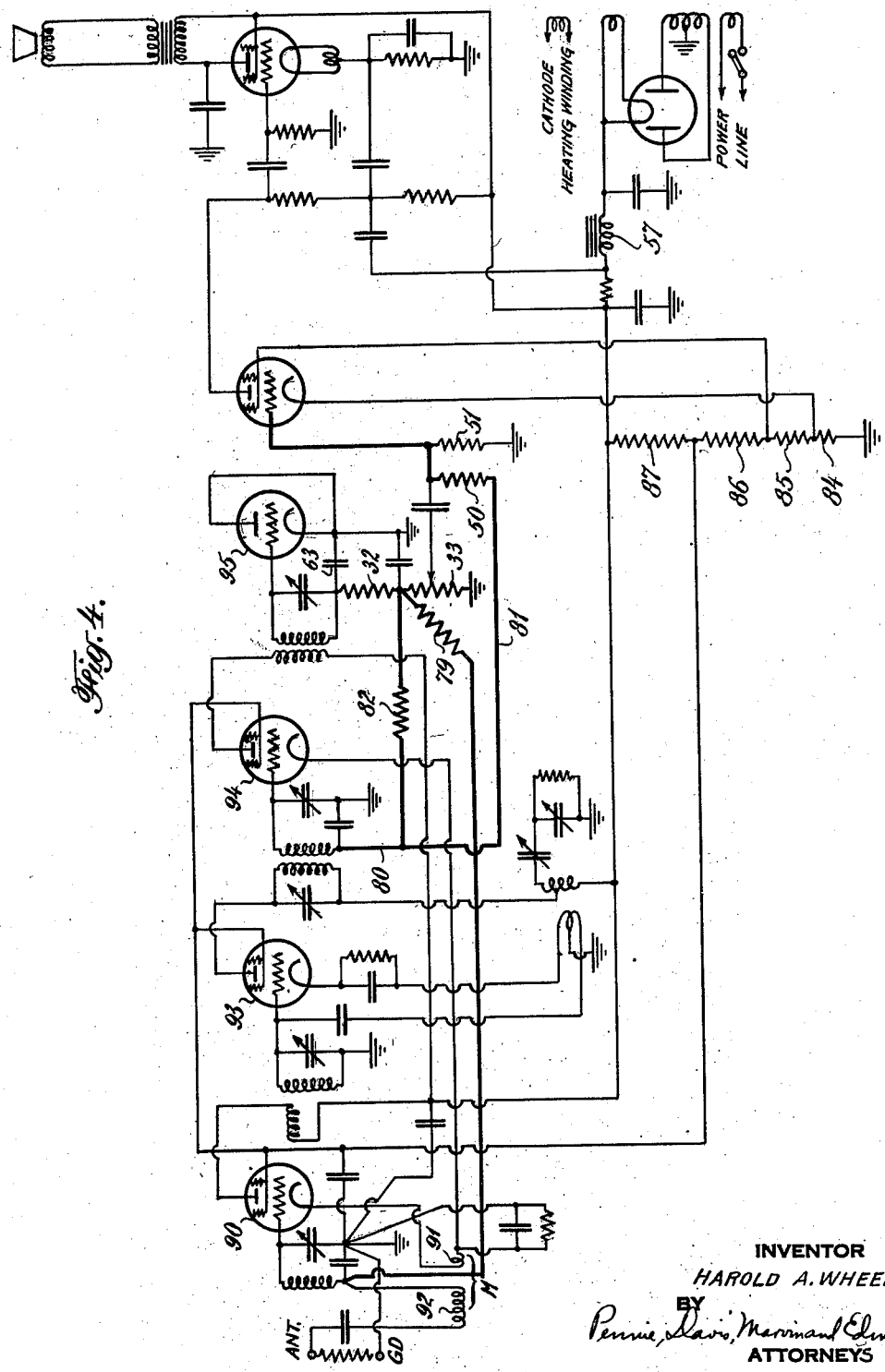

Patented Sept. 3, 1935

2,013,121

UNITED STATES PATENT OFFICE 2,013,121

AUTOMATIC AMPLIFICATION CONTROL

Harold A. Wheeler, Great Neck, N. Y., assignor to Hazeltine Corporation, a corporation of Delaware Continuation of application Serial No. 603,500, April 6, 1932. This application June 6, 1934, Serial No. 729,505. In Great Britain July 3, 1928

23 Claims. (Cl. 250—20)

This invention relates to amplifiers, and more particularly to amplifiers utilized in modulated carrier-current signaling systems wherein the limit of amplified signal intensity is automatically maintained substantially at a predetermined level.

This application is a continuation of my application Serial No. 603,500, filed April 6, 1932, and a continuation in part of my applications Serial No. 203,879, filed July 7, 1927, and Serial No. 526,857, filed April 1, 1931.

There have been described and claimed in my application Serial No. 203,879, filed July 7, 1927, and in my United States Letters Patent No. 1,879,863, forms of automatic amplification control systems in which the control of amplification is effected by applying a voltage derived from the output of a detector upon the control element of one or more of the tubes preceding the detector. These arrangements have been found very effective in controlling the volume output of a receiver; but even with such efficient arrangements it has been found that some volume variation is still experienced when the range of received signal intensities is very large. Such residual variation of volume is comparatively small for example, a ratio of 1000:1 in the received signal intensity may cause an output variation of about 3:1.

It is the purpose of this invention to further refine the automatic control operation so that the ratio of maximum to minimum output is further reduced. This further refinement of the operation is accomplished in accordance with this invention by applying to the control elements of one or more tubes following the detector, a biasing potential which varies in accordance with the variation of the signal strength at the detector. Such an arrangement is disclosed in my application Serial No. 526,857, of which this application is a continuation in part. The improvement due to this added feature depends on the change of amplification which is effected in the one or more tubes following the detector, which may be either audio frequency or carrier frequency amplifiers. In the latter case, the detector mentioned would be used only for supplying the automatic amplification control bias, and not for producing an audio frequency output.

Difficulties heretofore encountered in the application of automatic amplification control have been due largely to the curvature of the grid-voltage vs. plate-current characteristic of ordinary amplifier tubes when large negative grid biasing voltages have been applied. In most automatic control systems in general use, the control is effected by automatically varying the negative grid bias of a tube as the signal strength changes. Consequently, when the signal strength is so great as to increase the negative biasing potential to a point at or near the point of curvature of the tube characteristic, distortion is introduced.

I have found that by the use in an audio frequency amplifier of a tube characterized in that the product of the biasing potential change (increment of bias) on the control electrode times the mutual conductance of the tube remains substantially constant over a considerable range of variation of mutual conductance, a very much improved amplification control operation can be obtained. This relation corresponds to an inverse proportionality between the amplification in this amplifier and the increment of bias applied thereto.

In accordance with this invention, then, the rectified output of a detector is applied to the control electrode of an audio frequency tube preferably having the above noted characteristic. The effectiveness of the control is enhanced if the detector characteristic is such that the unidirectional, or direct current component of the rectified signal is directly proportional to the signal voltage; such a detector characteristic is obtainable by the use of a diode in a detector circuit in the manner described in my copending application Serial No. 526,857, previously mentioned.

Since, in general, an audio frequency tube is effective in controlling amplification over a more or less limited range of signal strength, it will usually be found desirable to use the automatic amplification control circuit with the audio frequency amplifier at the same time that an effective automatic amplification control circuit is applied to the carrier frequency amplifier tubes.

The invention will be more clearly understood from the following detailed description when read in conjunction with the accompanying figures, of which Fig. 1 represents a radio receiver employing automatic amplification control upon a radio-frequency amplifier and an audio-frequency amplifier;

Fig. 2 illustrates characteristics of vacuum tubes especially well adapted to function as audio-frequency amplifiers provided with an automatic amplification control system; and Figs. 3 and 4 illustrate application of the invention to superheterodyne types of receivers in which automatic amplification control is applied to a radio-frequency amplifier, an intermediate-frequency amplifier and an audio-frequency amplifier.

Fig. 1 illustrates a signal translating system which is a radio receiver comprising an antenna, a radio-frequency amplifier, a detector, and an audio-frequency amplifier. The first signal-frequency or radio-frequency amplifier tube 10 is of the four-electrode, screen-grid type, and is coupled to the antenna 11 by a radio-frequency coupling system 13 comprising a transformer 14 having a primary coil 15 and a secondary coil 16 tunable by a variable condenser 17. The transformer is constructed so that an effective capacity 18, shown in dotted lines, exists between the low potential end of the primary and the high potential end of the secondary. A resistance 19 is connected across the primary winding. The resistance 19 and effective capacity 18 function to give the coupling system a substantially uniform amplification over the tunable frequency range. There is connected between the cathode of tube 10 and ground the parallel combination of a resistive inductance 20 and a capacity 21, the purpose of which is to produce regeneration which increases the sensitivity of the amplifier.

The second signal-frequency, or radio-frequency tube 22, also of the screen-grid type, is coupled in tandem with the tube 10 by a tunable coupling transformer 23. A resistance 24 having a capacity 25 in parallel therewith is connected between the cathode of tube 22 and ground for the purpose of producing a permanent biasing potential upon the control grid of the tube, by virtue of the fact that the space path current flows through this resistance.

A detector tube 26, of the two-electrode, or diode type, is coupled in tandem to carrier-frequency amplifier 22 by means of a tunable coupling transformer 27. This detector and its associated circuit is preferably of a type which I designate a "peak" detector, described and claimed in my above mentioned copending application Serial No. 526,857; its function is to rectify the signal frequency to produce a uni-directional component and a modulation frequency, or audio-frequency component corresponding to the frequencies with which the signal-frequency, or radio-frequency, is modulated.

The detector tube may conveniently be of the three-electrode type, the plate 28 and the cathode 29 being tied together, as indicated in the drawings to constitute a single cathode, the plate also acting as an electrostatic shield. The electrode 30 in such a detector constitutes the output electrode. The transformer 27 comprises three windings, the primary 58 of which is connected in the output of amplifier tube 22, the secondary 59 of which, tunable by condenser 60, is coupled to the primary and also to the tertiary winding 31 which in turn is connected across the electrodes of the detector tube. As mentioned in my application Serial No. 526,857, the connection of the tertiary winding, instead of the secondary, to the detector electrodes has certain advantages which make this arrangement desirable. The output circuit of the detector comprises the winding 31 of transformer 27 and resistances 32 and 33 in series to ground. The resistance 33 may have shunted across it a condenser, or inherent capacity, indicated in dotted lines as capacity 34. A capacity 63 connects the lower end of winding 31 to the cathode 29.

As is more fully explained in my application Serial No. 526,857, the capacity 63 and resistances 32 and 33 cooperate in producing the rectifying action. The modulation frequency component of the signal voltage is developed across capacity 63 and the uni-directional component of the rectified voltage is developed across resistances 32 and 33. In this type of detector system there is obtained a "linear" relationship, i. e., a very close proportionality between the modulation-frequency voltage, the uni-directional voltage and the radio-frequency signal voltage.

The output of the detector, or a portion thereof, is coupled in tandem to the first audio frequency amplifier tube 35 by means of a condenser 36 tapped to a point on resistance 33 and connected to the control electrode 37 of amplifier 35; hence, the modulation component of the rectified voltage is applied to the grid 37. The adjustable contact between condenser 36 and resistance 33 constitutes a manual volume control. The amplifier 35 is of the so-called "variable-mu" or "remote cut-off" type having four electrodes comprising the control electrode 37, the screen grid 38, the cathode 39 and the anode 40.

The amplifier 35 is coupled in tandem through an audio-frequency transformer 41 to a pentode type tube 42, the output of which is coupled through a transformer 43 to the signal coil 44 of a loud speaker 62. A hum reducing coil 60 is connected in series with the signal coil 44 in a manner well understood in the art.

There is provided an automatic amplification control connection 61 between the output of detector 26 and the control electrode of the first radio frequency amplifier or repeating stage 10, in the manner disclosed in my copending application Serial No. 203,879 and in my Patent No. 1,879,863. This connection includes a resistance 45 connected between the low potential end of winding 31 and the low potential end of the secondary winding 16 of radio-frequency transformer 14. A condenser 46 is connected between the low potential end of winding 16 and ground, to keep the biasing voltage from the detector away from ground and still permit the tunable circuit 16, 17 to be closed. The operation of this automatic amplification control connection is more fully explained in my above mentioned copending application Serial No. 203,879 and in my Patent No. 1,879,863. All automatic amplification control connections (in addition to those which otherwise would be present) in all the drawings of this application are indicated by heavy lines. Briefly, an increase in the strength of the signal voltage at the antenna produces an increase in the rectified uni-directional current through resistances 32 and 33 in the detector output. Hence, the rectified uni-directional voltage at the output of the detector varies with the intensity of the received signal. Such an increase of current through resistances 32 and 33 increases the negative potential of point 47 with respect to ground and likewise the negative potential of the output electrode of the detector which in this case is the grid 30, thereby increasing the negative bias of the control grid of radio frequency amplifier 10. This increase of the negative grid bias in turn decreases the amplification or repeating ratio of the amplifier or repeater stage, so that the rectified voltage at the output of the detector is maintained much more uniform than the signal strength at the antenna, while tuning to signals whose intensities differ greatly.

Another feature of this automatic amplification control system, which is also described in my above mentioned application Serial No. 203,879 and in my Patent No. 1,879,863, is the visual resonance indicator 48 in the anode circuit of tube 10, which in this application is shown as a neon lamp. This neon lamp performs the same function as the resonance indicating meter shown in my above mentioned applications. When the system is tuned to resonance, this fact is indicated by the light intensity of the lamp becoming a minimum.

In accordance with this invention, automatic amplification control is applied to the audio-frequency amplifier or repeating stage 35. In Fig. 1 this system takes the form of a connection from the detector output to the control grid 37 of the amplifier 35. The system comprises a connection from the point 49 through a high resistance 50 to the control electrode 37. A high resistance 51 is connected between the control electrode 37 and ground for the purpose of maintaining the proper negative grid bias on the control electrode. The operation of the audio-frequency volume control circuit on the audio-frequency bias controlled repeater stage is supplemental to that of the radio-frequency volume control circuit on the radio-frequency, or carrier-frequency, repeater stage, and functions to further reduce moderate variations in the signal intensity which may still be present at the detector. Any increase in the unidirectional current of the detector produces a corresponding increase of the negative bias on the electrode 37 of tube 35.

Automatic amplification control systems for use with audio-frequency amplifiers have not heretofore been in general use because of the fact that an attempt to greatly diminish the negative bias on the grid has generally resulted in distortion of the audio-frequency signal, due to the swinging of the grid voltage over the relatively sharp lower bend of the amplifier characteristic curve of plate current versus grid bias, which characteristic is found in most tubes heretofore in general use. It has been found, however, that if a tube be used in the audio-frequency amplifier stage, which is characterized by a more gradual "cut-off", the tube will operate without objectionable distortion over a considerable range of grid bias potential, provided the amplitude of the signal is not too large. The signal amplitude can be kept within the proper limits, for this purpose, by the use of a manual volume control such as the adjustable tap on resistance 33, at the input of the audio stage, and full automatic amplification control on the radio frequency amplifier, together with a relatively high audio-frequency amplification.

It has been found that the so-called "variable-mu" tube is quite satisfactory for use as an audio-frequency amplifier provided with an automatic amplification control connection. When the imperfect automatic amplification control ahead of detector 26 permits the signal voltage applied to the detector to increase slightly, an increased audio frequency signal voltage is applied to the grid 37 of tube 35, and at the same time the grid bias voltage is made more negative, decreasing the amplification or signal translation ratio of the tube. These two changes can be made to compensate each other, as shown in the example illustrated in Figs. 1 and 2. In Fig. 1 a linear diode detector is used to supply both signal voltage and bias voltage to the grid 37, and therefore these vary in the same proportion. Also the internal resistance between the plate 40 and the cathode 39 is so great that the amplification of this tube is proportional to its mutual conductance. Therefore the amplified signal voltage is proportional to the product of the additional grid bias voltage times the mutual conductance. This product is a function of the parameters of any particular tube at given operating voltages. In Fig. 2 $E_c$ is the increment, or additional grid bias in volts, and $G_m$ is the mutual conductance in micromhos. The product of $E_c$ and $G_m$ is plotted as ordinates against $G_m$ as abscissas.

Curves A and B show the characteristics of two commercial "variable-mu" tubes under conditions approximated in Fig. 1. It is apparent that the product $E_c G_m$ is relatively constant for a range of values corresponding to changing the grid bias voltage, that is, the increment of grid bias times the signal translation ratio from the input to the output terminals of the tube is nearly constant over a considerable range of grid bias voltages. The product $E_c G_m$ varies only within the ratio of 2:1 while $G_m$ is varied in the ratio of more than 10:1. In other words, the imperfections of the automatic amplification control preceding the detector can be compensated so that a 10:1 variation in detector voltage is reduced to less than a 2:1 variation in amplified audio frequency voltage.

It will be noted that curve A, representing the characteristic of one of the tubes, is somewhat better adapted for automatic amplification control than is curve B representing the characteristic of the other tube. The shape of these curves will depend somewhat upon the initial grid bias, and whether the bias is obtained from a tap on the power supply resistance or by means of a cathode circuit resistance; and if the latter means be employed, upon whether or not the resistance is provided with a by-pass condenser for audio-frequencies.

In the design of a receiver which has actually been built, embodying the circuit of Fig. 1, the following values of resistance have been found satisfactory for use in the automatic amplification control circuits:

| | Megohms |
|---|---|
| Resistance 32 | ¼ |
| Resistance 33 | 1 |
| Resistance 45 | 1 |
| Resistance 50 | 2 |
| Resistance 51 | 2 |

A satisfactory value for condenser 63 to provide efficient detector operation is 25 micro-microfarads.

When the above mentioned values of resistance are employed, four-fifths of the total possible negative biasing potential from the detector is applied upon the radio-frequency amplifier 10 and two-fifths upon the audio-frequency amplifier 35.

The power supply system for the receiver of Fig. 1 is of a conventional type employing a power transformer 52, a double wave rectifier 53, a filter 54, resistances 55 and 56 across which the potentials for the anodes and screen grids of the tubes are taken. The loudspeaker field coil 57 of loudspeaker 62 is connected in the filter circuit in a conventional manner. The cathodes of the tubes are heated indirectly by the cathode heating winding.

Capacities and resistances are employed throughout the receiver in a conventional manner wherever their presence will improve the performance.

Fig. 3 illustrates the application of the invention to a superheterodyne type of receiver. The superheterodyne receiver comprises a radio-frequency amplifier tube 70; an oscillator-modulator tube 71; an intermediate frequency amplifier tube 72, for amplifying the band of frequencies at the output of the modulator, which is the difference between the signal-frequency in the radio frequency amplifier and the oscillator frequency; a diode detector 73; an audio-frequency amplifier 74; and an audio-frequency power tube 75 of the pentode type. The power supply system 83 is of a conventional type and is provided with a voltage dividing arrangement of resistors 84, 85, 86, 87 for furnishing the proper potentials for the various electrodes of the tubes. The diode detector 73 is arranged in a circuit somewhat similar to the diode 26 of Fig. 1, except that the input transformer 76 for the diode is of the two-winding type and has both its primary and secondary tunable.

The automatic amplification control system is shown in heavy lines and comprises resistances 32 and 33 in series between the low potential end of the secondary winding of transformer 76 and ground, in the manner of the similarly numbered resistances of Fig. 1. The automatic control circuits from the detector circuit to the electrodes of the various controlled tubes are connected at point 77. The automatic control circuit 61 for the radio-frequency amplifier includes resistance 79 and is similar to the radio-frequency control circuit of Fig. 1. The automatic control circuits 80 for the intermediate frequency amplifier and 81 for the audio-frequency amplifier are connected through resistance 82 to point 77. At the terminal of resistance 82 remote from point 77, the circuit 80 is led to the low potential end of the secondary winding of the input transformer of tube 72, so that an automatic biasing potential is impressed upon the grid of that tube. Similarly, the connection 81 is made between resistance 82 and the control electrode of tube 74 through resistance 50; and a resistance 51 is connected between the control electrode and ground. This audio-frequency control circuit is similar to that shown in Fig. 1.

Values for the resistances of the automatic amplification control circuits which have been found satisfactory in practice for this type of receiver, are as follows:

|  | Megohms |
| --- | --- |
| Resistance 32 | .1 |
| Resistance 33 | 1 |
| Resistance 79 | 2 |
| Resistance 82 | 4 |
| Resistance 50 | 4 |
| Resistance 51 | 2 |

It will be apparent that when the above resistance values are employed, the full negative bias due to the unidirectional potential across resistance 33 is impressed upon the radio-frequency amplifier, three-fifths of the full potential is impressed upon the intermediate-frequency amplifier and one-fifth upon the audio-frequency amplifier.

Fig. 4 illustrates a slight modification of the automatic amplification control system as applied to the radio-frequency, intermediate-frequency, and audio-frequency amplifiers of the superheterodyne type of receiver. The intermediate frequency amplifier 94 is arranged in a circuit quite similar to that of Fig. 3; the diode detector 95 is also similar to that of Fig. 3.

The automatic amplification control system is similar to that shown in Fig. 3 and the corresponding resistances are similarly numbered. Suitable values of these resistances are as follows:

|  | Megohms |
| --- | --- |
| Resistance 32 | .1 |
| Resistance 33 | 1 |
| Resistance 79 | 2 |
| Resistance 82 | 2 |
| Resistance 50 | 4 |
| Resistance 51 | 1 |

When the above values of resistances are employed the full negative biasing voltage (with respect to the unidirectional voltage across resistance 33) is applied to the grid of the radio-frequency tube, about 70% to the grid of the intermediate-frequency tube and about 15% to the grid of the audio-frequency tube.

The behavior of the automatic amplification control in Figs. 1, 3, and 4 is described briefly in this application. The resultant control is inherently dependent on the cooperation of two kinds of automatic control, classified respectively as "regressive" and "progressive", which kinds are mutually opposite in some respects.

Referring to Fig. 1, the regressive control is provided by the automatic bias voltage produced in rectifier 26 and applied as a control-grid bias to control, the amplification in the carrier-current amplifier 10. This control is classified as regressive because the repeater or amplifier 10, whose performance is regulated, is electrically antecedent in the system, with respect to the coil 31 from which the signal is coupled to the control device or rectifier 26. It is also characteristic of regressive control, as of the arrangment of Fig. 1, that the signal voltage coupled to the control device depends on the regressive control action. This signal voltage is maintained nearly but not quite independent of signal input, because some variation thereof is needed to secure the necessary variation of bias voltage, corresponding to a large range of signal input voltage.

The progressive control in Fig. 1 is provided by the automatic bias voltage produced in rectifier 26 and applied as a control-grid bias to control the amplification in the modulation-current amplifier 35. This control is classified as progressive because the repeater or amplifier 35, whose performance is regulated, is electrically subsequent in the system, with respect to the coil 31 from which the signal is coupled to the control device or rectifier 26. It is also characteristic of progressive control, as of the arrangement of Fig. 1, that the signal voltage coupled to the control device is independent of the progressive control action.

In Fig. 1, resistors 45, 50 and 51 are proportioned to provide relatively large variations of the bias voltage on the carrier-current amplifier 10, and relatively small variations of the bias voltage on the modulation-current amplifier 35. Therefore the major control action is regressive and the remainder is progressive. The regressive control action taken alone is subject to the limitation that there is a residual variation of the signal voltage coupled to the rectifier. The function of the progressive control action is to cooperate with the regressive control action and thereby alleviate this limitation. The resulting output of the system is maintained substantially independent of signal input, by proportioning the two kinds of control action as described herein. The performance obtained by this cooperation is far superior to that obtained by either kind of control used alone.

I claim:

1. In a modulated carrier current signaling system employing a rectifier which produces a modulated uni-directional voltage, and a modulation current amplifier, means coupling the output of said rectifier to the input terminals of said amplifier, said means being adapted to transmit the modulation component but not the uni-directional component of said voltage, and a direct-current connection between the output terminals of said rectifier and a control element of said amplifier for impressing the uni-directional component of said voltage upon said control element, whereby the amplification of said amplifier is automatically varied inversely as the signal strength at said rectifier, said modulation current amplifier being characterized in that the product of incremental control element bias times the signal translation ratio from input to output terminals is nearly constant over a substantial range of bias.

2. In a modulated carrier-current signaling system, a carrier-current amplifier, a rectifier and a modulation-current amplifier, coupled in tandem in the order recited, which rectifier produces a modulated uni-directional voltage, a connection from said rectifier to a control electrode of said carrier-current amplifier, whereby variations of the signal strength at said rectifier are maintained relatively small in comparison with variations of the signal strength at the input of said carrier-current amplifier, and a connection, traversable by direct current but offering a high impedance to alternating current, from said rectifier to a control electrode of said modulation-current amplifier for further compensating variations of the signal strength, said modulation current amplifier being characterized in that the product of incremental control element bias times the signal translation ratio from input to output terminals is nearly constant over a substantial range of bias.

3. In a signaling system, a vacuum tube detector having an output electrode and a vacuum tube amplifier having a cathode and a control electrode coupled to said detector, means for maintaining said output electrode normally negative relative to at least part of said amplifier cathode, means for causing said output electrode to become more negative in the presence of a signal and means for impressing at least a portion of the negative potential of said output electrode upon said control electrode, whereby the amplification of said amplifier is regulated automatically, said amplifier being characterized in that the product of incremental control element bias times the signal translation ratio from the input to the output terminals of the tube is nearly constant over a considerable range of grid bias voltages.

4. Apparatus according to claim 3 in which the means for impressing at least a portion of the negative potential of said output electrode upon said control electrode comprises a high resistance between said output electrode and said cathode and a connection from a point of said resistance to said control electrode.

5. In a signaling system, a rectifier and an amplifier having its input terminals coupled to said rectifier, said rectifier being of the type in which there is produced a uni-directional voltage directly proportional to an applied signal voltage, said amplifier being of the type in which the product of mutual conductance and increment of grid bias voltage is nearly constant over a considerable range of values of mutual conductance, and means for applying at least a portion of said uni-directional voltage upon a control element of said amplifier.

6. In a signaling system, a vacuum tube detector having an output electrode, and a vacuum tube amplifier having a cathode and a control electrode coupled to said output electrode, said detector being characterized by its producing a uni-directional voltage directly proportional to the magnitude of an applied alternating signal voltage, said amplifier being characterized in that the product of its mutual conductance and the increment of grid bias voltage applied between said cathode and control electrode is nearly constant over a considerable range of mutual conductance, a resistance connected between said output electrode and said cathode across which said uni-directional voltage is developed, and a connection between a point of said resistance and a control element of said amplifier, whereby the amplification of said amplifier is automatically regulated to maintain its alternating voltage output nearly constant in spite of a substantial variation of its alternating voltage input.

7. In a signaling system for receiving and utilizing a modulated carrier frequency signal, a detector which produces a uni-directional voltage directly proportional to an applied signal voltage, a modulation-frequency amplifier coupled to the output of said detector, said amplifier comprising a vacuum tube having an anode, a cathode and a control electrode and being characterized by having a nearly constant product of mutual conductance and increment of grid bias voltage applied between said cathode and control electrode over a substantial range of mutual conductance, and a direct current connection between the output of said detector and said control electrode for maintaining substantially constant the modulation-frequency voltage output of said amplifier, in spite of variations in the modulation-frequency voltage output of said detector.

8. In a modulated carrier-current signaling system a rectifier and an amplifier coupled to the output of said rectifier, said rectifier being of the type in which there is produced in its output a uni-directional voltage and a modulation-frequency voltage, both of which voltages are substantially proportional to an applied modulated carrier voltage, means for applying each of said uni-directional and modulation-frequency voltages to a control element of said amplifier, said amplifier being characterized in that the product of mutual conductance and increment of control element bias voltage is nearly constant over a considerable range of values of mutual conductance.

9. Apparatus according to claim 8 in which said uni-directional and modulation-frequency voltages are each applied to a control element of said amplifier through separate current paths.

10. Apparatus according to claim 8 in which said uni-directional voltage is applied to a control electrode of said amplifier by a direct-current path connecting the output of said rectifier with said control electrode, and said modulation-frequency voltage is applied to the same control electrode by a path including a condenser between said rectifier output and said control electrode.

11. In a modulated carrier-current signaling system, a carrier-current amplifier, a rectifier, and a modulation-current amplifier, coupled in tandem in the order recited, said rectifier producing a modulation-frequency voltage and a uni-directional voltage in response to a modulated carrier-frequency signal applied to said carrier-current amplifier, said modulation-current amplifier being characterized by having a nearly constant product of mutual conductance and modulation-frequency voltage applied thereto over a considerable range of mutual conductance, a first direct-current connection between the output of said rectifier and a control element of said carrier-current amplifier for impressing at least a portion of said uni-directional voltage thereon, whereby changes in the intensity at the output of said detector are maintained small in spite of wide variations in the signal strength intensity applied to said carrier-current amplifier, and a second direct-current connection between said detector output and a control electrode of said modulation-current amplifier for impressing at least a portion of said uni-directional voltage thereon, whereby variations in the output intensity thereof are substantially compensated.

12. Apparatus according to claim 11 in which a different proportion of said uni-directional voltage is applied to said carrier-current amplifier than to said modulation-current amplifier.

13. Apparatus according to claim 11 in which resistance is connected in series between said rectifier output and ground, and said first direct-current connection is connected to said rectifier output by being tapped to a point of said resistance and said second direct-current connection is tapped at another point of said resistance.

14. In a signal translating system, a bias controlled repeater stage having input and output terminals, characterized in that the product of the increment of bias times the signal translation ratio from input to output terminals is nearly constant over a considerable range of bias voltage, means for impressing said signal on said input terminal, and means for maintaining said increment of bias directly proportional to said signal impressed on said input terminal, whereby the signal transferred to said output terminal is held nearly constant while the signal impressed on said input terminal varies over a range of values.

15. A signal repeating system comprising a plurality of repeating stages coupled in tandem, a rectifier coupled at a point of said system between two of said stages, said rectifier producing a uni-directional voltage which is directly proportional to the signal voltage at said point, a connection for applying at least a portion of said uni-directional voltage to a control electrode of a repeating stage preceding the point of coupling of said rectifier, and a second connection for applying a portion of said uni-directional voltage to a control electrode of a repeating stage following the point of coupling of said rectifier, the latter stage being characterized in that the product of the increment of bias times the signal translation ratio from its input to its output terminals is nearly constant over a considerable range of bias voltage, whereby the repeating ratio is automatically regulated to maintain the output voltage of said repeating system nearly constant in spite of relatively large variations of the signal voltage at the input of said system.

16. An amplifier system comprising a plurality of amplifying stages coupled in tandem, a rectifier coupled at a point of said system between two of said stages, said rectifier producing a uni-directional voltage which is directly proportional to signal voltage at said point, a connection for applying at least a part of said uni-directional voltage to a control electrode of an amplifying stage preceding the point of coupling of said rectifier, and a second connection for applying a part of said uni-directional voltage which is of smaller magnitude than the first mentioned part, to a control electrode of an amplifying stage following the point of coupling of said rectifier, the latter stage being characterized in that the product of the increment of bias times the signal translation ratio from its input to its output terminals is nearly constant over a considerable range of bias voltage, whereby the amplification is automatically regulated to maintain the output voltage of said amplifier system nearly constant in spite of relatively large variations of the signal voltage at the input of said system.

17. An amplifier system comprising a plurality of amplifying stages coupled in tandem, a rectifier coupled at an intermediate point of said system, a resistance connected in circuit with said rectifier, across which a rectified uni-directional voltage is developed which is directly proportional to signal voltage at said point, a connection from a point of said resistance for applying at least a part of said uni-directional voltage to a control electrode of an amplifier stage preceding the point of coupling of said rectifier, and a second connection from a point of said resistance for applying at least a part of said uni-directional voltage to a control electrode of an amplifier following the point of coupling of said rectifier, the latter amplifier being characterized in that the product of the increment of bias times the signal translation ratio from its input to its output terminals is nearly constant over a considerable range of bias voltage, whereby the amplification is automatically regulated to maintain the output voltage of said amplifier system nearly constant in spite of relatively large variations of signals at the input of said amplifier system.

18. An amplifier system comprising a plurality of amplifying stages coupled in tandem, a rectifier coupled at an intermediate point of said amplifier system, said rectifier producing a uni-directional voltage which is directly proportional to signal voltage at said point, a connection for applying at least a part of said uni-directional voltage to a control electrode of an amplifying stage preceding the point of coupling of said rectifier, and a second connection for applying at least a part of said uni-directional voltage to a control electrode of a second amplifying stage following the point of coupling of said rectifier, said second amplifying stage being characterized in that the product of mutual conductance times increment of control electrode bias voltage is nearly constant over a considerable range of bias voltages, whereby the amplification is automatically regulated to maintain the output voltage of said amplifier system nearly constant in spite of relatively large variations of signal input voltage.

19. In a signaling system, a first amplifier having a control electrode, a rectifier and a second amplifier having a control electrode, connected in tandem in the order recited, said rectifier being adapted to produce a uni-directional voltage directly proportional to the signal output voltage of said first amplifier, a connection from said rectifier for impressing at least a portion of said uni-directional voltage upon said control electrode of said first amplifier, and another connection from said rectifier for impressing at least a portion of said uni-directional voltage upon said control electrode of said second amplifier, said second amplifier being characterized in that the product of increment of control electrode bias times mutual conductance is nearly constant over a substantial range of bias voltage.

20. A signal repeating system comprising a plurality of repeating stages coupled in tandem, rectifying means coupled to said system between two of said stages, said means producing a uni-directional voltage at each of two points therein which is directly proportional to the signal voltage applied to said means, a connection from one of said two points to a control electrode of a repeating stage preceding the coupling of said rectifying means, and a second connection from the other of said two points to a control electrode of a repeating stage following the coupling of said rectifying means, the latter repeating stage being characterized in that the product of the increment of bias times the signal translation ratio from its input to its output terminals is nearly constant over a considerable range of bias voltage, whereby the repeating ratio is automatically regulated to maintain the output voltage of said repeating system nearly constant in spite of relatively large variations of the signal voltage at the input of said system.

21. In a modulated carrier-current signaling system, a carrier-current amplifier, a rectifier and a modulation-current amplifier, coupled in tandem in the order recited, said modulation current amplifier having input and output terminals and being characterized in that the product of the increment of bias times the signal translation ratio from its input to its output terminals is nearly constant over a considerable range of bias voltage, regressive control means providing regressive automatic control of the amplification in said carrier-current amplifier, and progressive control means for providing progressive automatic control of the amplification in said modulation-current amplifier, said regressive and progressive control means being relatively proportioned to cooperatively maintain the output of said system substantially independent of signal input over a large range of signal input voltage.

22. In a modulated carrier-current signaling system, a carrier-current amplifier, a rectifier and a modulation-current amplifier, coupled in tandem in the order recited, said modulation current amplifier having input and output terminals and being characterized in that the product of the increment of bias times the signal translation ratio from its input to its output terminals is nearly constant over a considerable range of bias voltage, regressive control means providing regressive automatic control of the amplification in said carrier-current amplifier, and progressive control means for providing progressive automatic control of the amplification in said modulation-current amplifier, said regressive control means being proportioned to maintain the output of said modulation-current amplifier nearly but not quite independent of signal input over a large range of signal input voltage, and said progressive control means being proportioned to cooperatively control the amplification in said modulation-current amplifier, thereby maintaining the output thereof substantially independent of signal input over a large range of signal input voltage.

23. In a modulated carrier-current signaling system, a carrier-current amplifier, a rectifier and a modulation-current amplifier, coupled in tandem in the order recited, said modulation current amplifier having input and output terminals and being characterized in that the product of the increment of bias times the signal translation ratio from its input to its output terminals is nearly constant over a considerable range of bias voltage, regressive control means providing regressive automatic control of the amplification in said carrier-current amplifier, and progressive control means for providing progressive automatic control of the amplification in said modulation-current amplifier, said regressive control means being proportioned to maintain the output of said rectifier nearly but not quite independent of signal input over a large range of signal input voltage, and said progressive control means being proportioned to cooperatively control the amplification in said modulation-current amplifier, thereby maintaining the output thereof substantially independent of signal input over a large range of signal input voltage.

HAROLD A. WHEELER.